United States Patent
Ueda et al.

(10) Patent No.: US 11,394,238 B2
(45) Date of Patent: Jul. 19, 2022

(54) SYSTEM CONTROL DEVICE AND METHOD OF SYSTEM CONTROL

(71) Applicant: Mitsubishi Electric Corporation, Chiyoda-ku (JP)

(72) Inventors: Kenji Ueda, Tokyo (JP); Tomihiro Takano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 76 days.

(21) Appl. No.: 16/618,951

(22) PCT Filed: Mar. 23, 2018

(86) PCT No.: PCT/JP2018/011751
§ 371 (c)(1),
(2) Date: Dec. 3, 2019

(87) PCT Pub. No.: WO2019/044012
PCT Pub. Date: Mar. 7, 2019

(65) Prior Publication Data
US 2020/0266659 A1    Aug. 20, 2020

(30) Foreign Application Priority Data

Sep. 1, 2017   (JP) .............................. JP2017-168350

(51) Int. Cl.
*H02J 13/00*     (2006.01)
*G05B 5/01*      (2006.01)

(52) U.S. Cl.
CPC .......... *H02J 13/00006* (2020.01); *G05B 5/01* (2013.01)

(58) Field of Classification Search
CPC ............. H02J 13/00006; H02J 2310/12; H02J 2300/24; H02J 3/12; H02J 13/00;
(Continued)

(56) References Cited

U.S. PATENT DOCUMENTS

2003/0158677 A1* 8/2003 Swarztrauber ......... G01D 4/008
702/62
2007/0057513 A1* 3/2007 Shimomura .............. H02P 9/04
290/40 C
(Continued)

FOREIGN PATENT DOCUMENTS

| JP | 2012-182897 A | 9/2012 |
| JP | 2016-36252 A | 3/2016 |
| WO | WO 2014/080514 A1 | 5/2014 |

OTHER PUBLICATIONS

International Search Report dated May 1, 2018 in PCT/JP2018/011751 filed Mar. 23, 2018.

*Primary Examiner* — Ziaul Karim
(74) *Attorney, Agent, or Firm* — Xsensus LLP

(57) ABSTRACT

The present invention includes a hunting determination unit configured to determine whether hunting has occurred or not for each of control devices in a power transmission and distribution system based on a control history of the control devices, a time constant calculation unit configured to calculate an adjustment time constant in which a time constant of the control device having state information indicating a state of the control device, with a high significance level, is increased, when the hunting determination unit determines that the hunting has occurred in one or more of the control devices, and a time constant transmission unit configured to transmit the adjustment time constant to the control device.

8 Claims, 12 Drawing Sheets

(58) Field of Classification Search
CPC ........... G05B 5/01; Y02B 90/20; Y02E 10/56; Y04S 20/00
See application file for complete search history.

(56) References Cited

U.S. PATENT DOCUMENTS

| | | | |
|---|---|---|---|
| 2012/0059544 A1* | 3/2012 | Kinoshita ............. | B60W 20/15 701/22 |
| 2015/0233975 A1* | 8/2015 | Itaya ................ | G01R 19/16528 324/127 |
| 2015/0284022 A1* | 10/2015 | Kudo ....................... | B62D 6/06 701/41 |
| 2017/0017298 A1* | 1/2017 | Biswas ................... | G06F 13/36 |

* cited by examiner

F I G. 1
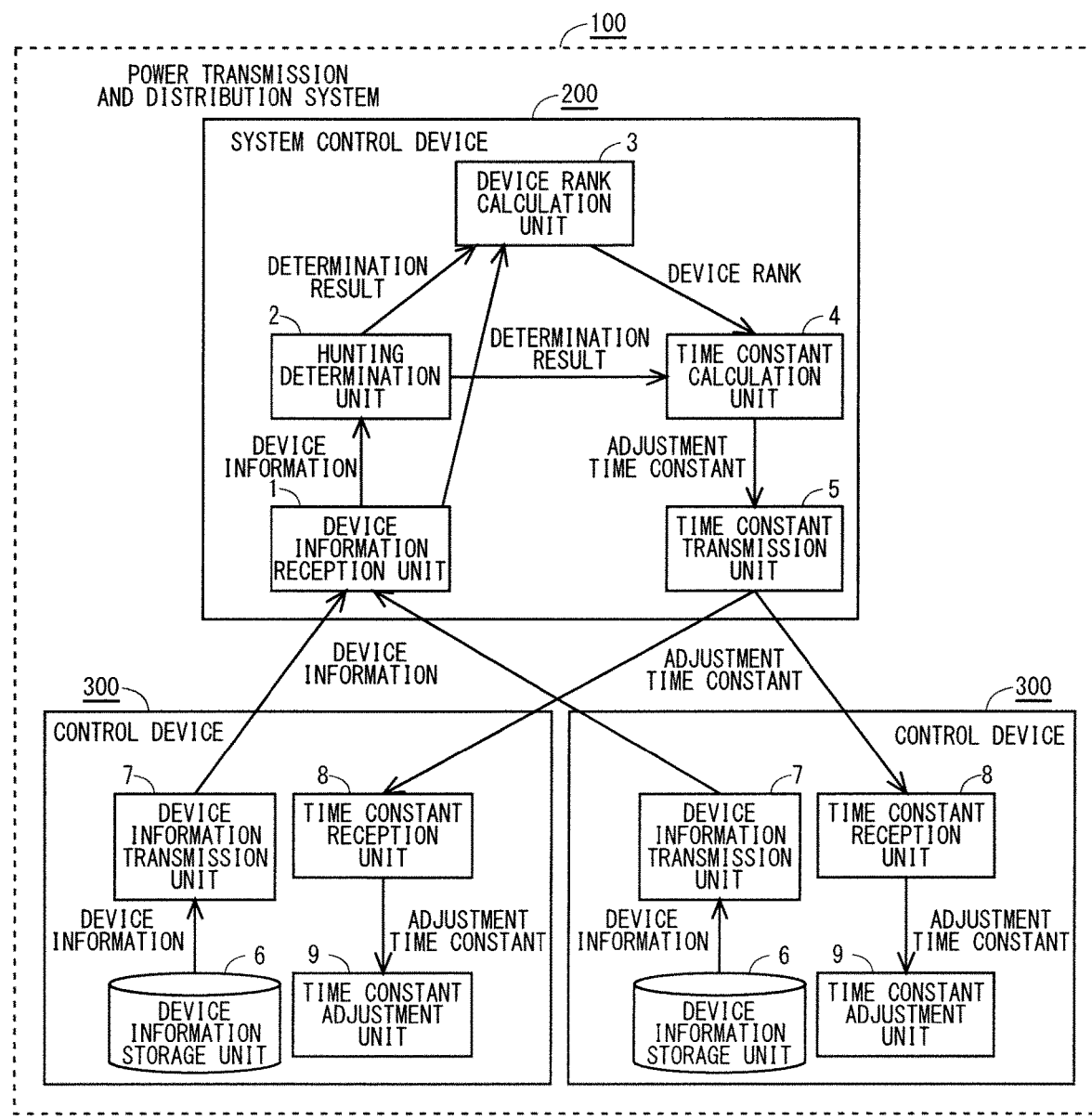

PROCESSING OF SYSTEM CONTROL DEVICE

PROCESSING OF CONTROL DEVICE

PROCESSING OF CONTROL DEVICE

PROCESSING OF SYSTEM CONTROL DEVICE

PROCESSING OF CONTROL DEVICE

PROCESSING OF CONTROL DEVICE

PROCESSING OF SYSTEM CONTROL DEVICE

PROCESSING OF POWER CONSUMPTION FACILITY

PROCESSING OF POWER GENERATION FACILITY

PROCESSING OF CONTROL DEVICE

PROCESSING OF CONTROL DEVICE

PROCESSING OF CONTROL DEVICE

PROCESSING OF SYSTEM CONTROL DEVICE

SYSTEM CONTROL DEVICE AND METHOD OF SYSTEM CONTROL

TECHNICAL FIELD

The present invention relates to a technique for controlling a control device.

BACKGROUND ART

In order to maintain the voltage distribution/current distribution of a power transmission and distribution system within an appropriate range, Patent Document 1 discloses a technique for dynamically controlling the time constants of a plurality of control devices installed in a power transmission and distribution system. When controlling the time constants of a plurality of control devices in such a power transmission and distribution system, as a result of control of the time constants, coordination among the control devices is failed, leading to occurrence of over-control, and hunting in which voltage and current vibrate occurs. It is generally known that, when the hunting occurs, increasing the time constant of the control device in which the hunting has occurred reduces the number of operations (in the case where the control device is a Load Ratio Control Transformer (LRT), reduces the number of taps) of each control device, thereby eliminating the hunting.

PRIOR ART DOCUMENTS

Patent Documents

[Patent Document 1] Japanese Patent Application Laid-Open No. 2012-182897

SUMMARY

Problem to be Solved by the Invention

In the prior art, when hunting occurs in each control device in a power transmission and distribution system, the time constant of the control device in which hunting has occurred is individually changed. In this case, every time hunting occurs, the process of suppressing the hunting by increasing the time constant of the control device in which the hunting has occurred is repeated. Accordingly, when the adjustment of the time constant of each control device is repeated with coordination failure in the power transmission and distribution system, the time constant of a specific control device may become too large and deviation occurs. For example, the number of operations (the number of LRT taps or the like) varies among control devices in the power transmission and distribution system.

Accordingly, if the numbers of operations are varied, the state of the control devices is likely to be varied when viewed in the whole power transmission and distribution system. Specifically, deviation occurs in that deterioration is concentrated on a specific control device (a control device with the larger number of operations tends to deteriorate) and in that power loss is concentrated on a specific control device (a control device with the larger number of operations tends to lose more power).

From the viewpoint of reducing operational costs, it is desirable that the control devices in the power transmission and distribution system are evenly deteriorated, and it is desirable to prevent deviation that further increases the number of operations of a control device with having large power loss. An object of the invention is to prevent the deviation of the state of the control devices in the power transmission and distribution system, while suppressing the hunting of each control device in the power transmission and distribution system.

Means to Solve the Problem

In order to solve the above-described problems and achieve the object, the system control device according to the present invention includes a hunting determination unit configured to determine whether hunting has occurred or not for each of control devices in a power transmission and distribution system based on a control history of the control devices, a time constant calculation unit configured to calculate an adjustment time constant in which a time constant of the control device having state information indicating a state of the control device, with a high significance level, is increased, when the hunting determination unit determines that the hunting has occurred in one or more of the control devices, and a time constant transmission unit configured to transmit the adjustment time constant to the control device.

Effects of the Invention

While suppressing the hunting of the control devices in the power transmission and distribution system, the state can be prevented from being deviated.

BRIEF DESCRIPTION OF DRAWINGS

FIG. 1 A block diagram illustrating a configuration example of a system control device according to Embodiment 1.

DESCRIPTION OF EMBODIMENTS

Figure 2:
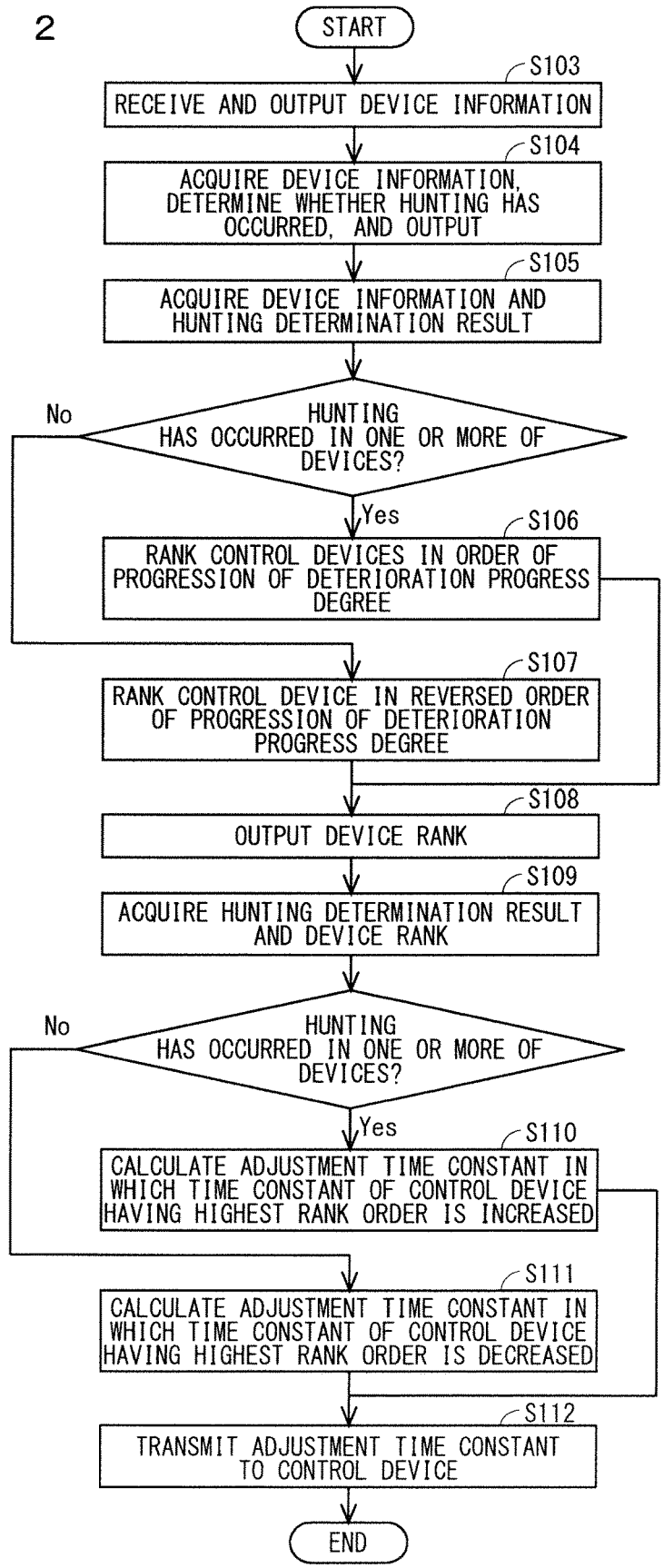
FIG. 2 A flowchart illustrating a flow of processes for adjustment time constant calculation of the system control device according to Embodiment 1.

Hereinafter, a system control device 200 and a system control method according to Embodiments of the present invention will be described in detail referring to the drawings. Note that the present invention is not limited to Embodiments.

Embodiment 1

FIG. 1 is a block diagram illustrating one configuration example of a system control device 200 and system control devices 300 within a power transmission and distribution system 100 according to Embodiment 1. The system control device 200 includes a device information reception unit 1, a hunting determination unit 2, a device rank calculation unit 3, a time constant calculation unit 4, and a time constant transmission unit 5. The control device 300 includes a device information storage unit 6, a device information transmission unit 7, a time constant reception unit 8, and a time constant adjustment unit 9.

The system control device 200 is a device that adjusts the time constants of the control devices 300 in the power transmission and distribution system. Here, the control devices 300 include, for example, an LRT installed in a substation, a Step Voltage Regulator (SVR) installed on a distribution line, and a voltage regulator such as a DC/DC converter for DC transmission and distribution, and so forth. The control devices 300 periodically regulate the voltage in order to keep the voltage within a specified value. Each of the control devices 300 has a time constant. Due to this time constant, the control device 300 sets the frequency of voltage regulation with a temporal buffer.

That is, by adjusting the time constant, the frequency of voltage regulation of the control device 300 can be changed. As the time constant increases, the frequency of adjustment decreases, and as the time constant decreases, the frequency of adjustment increases. Specifically, when the control device 300 is an LRT, the number of taps decreases as the time constant increases, and the number of taps increases as the time constant decreases. Such control using a time constant is known as the prior art.

Each unit of the system control device 200 will be described. The device information reception unit 1 of the system control device 200 receives device information transmitted from each control device 300. Here, the device information includes a control history at each time of the control device 300 and state information of the control device 300 at each time of the control device 300. For example, the device information is information on devices such as tap switching times, a tap voltage, and a control target voltage. Here, the state information is information representing the state of the control device 300, and is information on a deterioration progress degree, power loss and the like. State information with a high significance level indicates that the deterioration progress degree has progressed or power loss is large, and the state information with a low significance level indicates that the deterioration progress degree has not progressed or power loss is small.

In Embodiment 1, although the deterioration progress degree, which is the state information on each device, is provided as device information, the device information is not limited thereto. The deterioration progress degree may be calculated from device information such as the tap switching times and the voltage information of the device. The calculation of the deterioration progress degree may be executed by the control device 300 or may be executed by the system control device 200, and is not limited to either device.

Based on the control history received by the device information reception unit 1, the hunting determination unit 2 of the system control device 200 determines whether or not hunting has occurred for each control device 300. Various methods for determining hunting are known. For example, hunting can be determined based on whether the tap voltage or the control target voltage vibrates in a predetermined period. Also, for example, hunting can be determined by calculating the amplitude at each frequency with respect to the tap voltage or the control target voltage by using the discrete Fourier transform, and determining whether the amplitude at a predetermined frequency component exceeds a predetermined value.

The device rank calculation unit 3 of the system control device 200 calculates rank order for adjusting the time constants of respective control devices 300 so that the progress of deterioration of the control devices 300 is leveled while suppressing the hunting of each control device 300 based on the deterioration progress degree received by the device information reception unit 1 and a hunting determination result of the hunting determination unit 2.

In Embodiment 1, although the rank order for the control devices 300 subject to control the time constants is determined based on the deterioration progress degrees, the determination of the rank order is not limited thereto and the device rank calculation unit 3 performs ranking based on the state information. As the state information, the rank order may be determined based on the power loss to be described in detail in Embodiment 2.

It is desired to adjust that the time constant of the control device 300 of which deterioration progress degree has progressed more to be preferentially increased so as not to promote deterioration of the control device 300 of which deterioration progress degree has progressed even more. Therefore, when the hunting determination unit 2 determines that hunting has occurred in one or more control devices 300, the device rank calculation unit 3 ranks the control devices 300 in the order of progression of the deterioration progress degree. Here, the deterioration progress degree of a control device j at the current time is set as d(j).

For example, when the control device 300 is the LRT, the deterioration progress degree d(j) is a value obtained by dividing the cumulative value of tap switching times by the average value of the total tap switching times during the period from the installation to the failure or replacement.

The control devices 300 are ranked in the order of progression of the deterioration progress degree d(j).

Further, for example, when the control device 300 is a DC/DC converter, the deterioration progress degree d(j) is a value obtained by dividing the output power amount of the DC/DC converter by the average value of the total output power amount during the period from the installation to the failure or replacement. The control devices 300 are ranked in the order of progression of the deterioration progress degree d(j). The average values described here may be calculated in advance based on the operation record of the control device 300.

Here, hunting can be prevented by increasing the time constant, however, on the other hand, there has been a problem in that if the time constant is excessively increased, the control response will be delayed and due to rapidly changing power such as power load and photovoltaic power generation, the voltage distribution and current distribution cannot be maintained within an appropriate range. For this reason, it is desirable to adjust the time constant to be small within a range where hunting does not occur so that the time constant does not become excessively large.

Therefore, when no hunting has occurred in the control device 300, it is desirable to adjust a large time constant as small as possible within a range where hunting does not occur. Therefore, when the hunting determination unit 2 determines that no hunting has occurred in one or more control devices 300, the device rank calculation unit 3 further ranks the control devices 300 in the reversed order of progression of the deterioration progress degree.

The time constant calculation unit 4 of the system control device 200 calculates the time constant of each control device 300 based on the determination result of the hunting determination unit 2 and the rank order determining the time constant of each control device 300 calculated by the device rank calculation unit 3. If hunting has occurred even with one control device 300, the highest priority is to suppress hunting. To this end, the time constant of any control device 300 in the power transmission and distribution system 100 need be increased.

When the hunting determination unit 2 determines that hunting has occurred in one or more control devices 300, the time constant calculation unit 4 calculates an adjustment time constant in which the time constant of the control device 300 selected according to the rank order is increased.

Specifically, the time constant calculation unit 4 calculates a new adjustment time constant in which the time constant of the control device 300, which is determined to be the most progressed in deterioration, is increased by a predetermined time (for example, 1 second) based on the rank order of the deterioration progress degree. Giving the priority to the control device 300 having the higher rank, the time constant is increased; therefore, it is expected that the deterioration progress degree d(j) will be suppressed from progressing while hunting is suppressed, and the deterioration progress degree d(j) will be leveled.

Meanwhile, when the hunting determination unit 2 determines that no hunting has occurred in one or more control devices 300, the time constant calculation unit 4 calculates a new adjustment time constant in which the time constant of the control device 300, which is determined to be the least progressed in deterioration, is decreased by a predetermined time (for example, 1 second) based on the deterioration progress degree. Giving the priority to the control device 300 having the higher rank, the time constant is decreased; therefore, it is expected that the time constant will be prevented from being excessively large, and the deterioration progress degree d(j) will be leveled.

Such calculation of the adjustment time constant is repeatedly executed when the hunting determination unit 2 determines that hunting has occurred in one or more control devices 300. In Embodiment 1, control is not performed so as to update the time constant of the control device 300 in which hunting has occurred, and the time constants are updated for any control devices 300 in the power transmission and distribution system, even if no hunting has occurred. In particular, control is performed so as to change the time constant of the control device 300 of which deterioration progress degree has progressed.

In other words, by changing the time constant of the control devices 300 other than the control device 300 in which hunting has occurred, coordination with other control devices 300 in the same system can be achieved, and hunting of the control device 300 in which hunting has occurred can be stopped. If hunting does not stop even after the time constant is changed, or if hunting occurs in another control device 300 by changing the time constant, hunting of one or more control devices 300 again is determined to have occurred.

In Embodiment 1, although the adjustment time constant of the control device 300 of the most progressed in deterioration is calculated based on the rank order of the deterioration progress degree, the adjustment time constant may be calculated by selecting the control device 300 of the most progressed in deterioration (the control device 300 having the state information with the highest significance level) without executing the calculation of the rank order. When calculating the adjustment time constant of the control device 300 of the least progressed in deterioration, the adjustment time constant may be calculated by selecting the control device 300 of the least progressed in deterioration (the control device 300 having the state information with the lowest significance level) without executing the calculation of rank order.

Here, although wordings "the control device 300 of the most progressed in deterioration (the control device 300 having the state information with the highest significance level)" and "the control device 300 of the least progressed in deterioration (the control device 30 having the state information with the lowest significance level)" are used above, as long as the control device 300 is progressed in deterioration (the control device 300 having the state information with a high significance level) or is not progressed in deterioration (the control device 300 having the state information with a low significance level), deterioration progressed and the state information are not limited to the highest or lowest.

In addition, when the process is repeated, instead of calculating the adjustment time constant of the control device 300 of which deterioration progress degree has most progressed (the control device 300 having the state information with the highest significance level) every time, control may be performed so that the adjustment time constant of the control devices 300 is calculated in the order of progression of the deterioration progress degree of the control devices 300 (the control device 300 having the state information with a high significance level).

More specifically, each time the time constant of the control device 300 is updated with the adjustment time constant, the hunting determination unit 2 determines whether hunting has occurred or not, each time the hunting determination unit 2 determines that hunting has occurred in one or more control devices 300, the time constant calculation unit 4 calculates the adjustment time constants in which the time constants of the control devices 300 in the rank order of the control device 300 having the state information with higher significance level, and the time constant transmission unit 5 transmits the calculated adjustment time constant to the corresponding control device 300, and updates the time constant of the control device 300 with the adjustment time constant.

In addition, each time the hunting determination unit 2 determines that no hunting has occurred in one or more control devices 300, the adjustment time constants that are decreased in the time constants of the control devices 300 are calculated in the rank order of the control device 300 having the state information with lower significance level. The time constant transmission unit 5 transmits the calculated adjustment time constant to the corresponding control device 300, and updates the time constant of the control device 300 with the adjustment time constant.

Subsequently, each unit of the system control device 300 will be described. The device information storage unit 6 of the control device 300 stores the control history at each time of the control device 300 and the device information that is the state information of the deterioration progress degree of the control device 300 at each time of the control device 300. The control history of the control device 300 is, for example, the tap voltage at each time when the control device 300 is an LRT, and the control target voltage, control target current, or control target power at each time when the control device 300 is a DC/DC converter.

The deterioration progress degree of the control device 300 is represented by, for example, a cumulative value of the tap switching times when the control device 300 is an LRT. Or, when the control device 300 is a DC/DC converter, the deterioration progress degree is represented by a cumulative value of output power amount (output power×time) as information for indicating that large power has been output for a long time. In the case of power electronics equipment, outputting a large amount of power for a long time deteriorates the equipment.

In Embodiment 1, a power transmission and distribution system is assumed, and plurality of control devices 300 are assumed to be provided in the system. Note that, when controlling a system in which an AC system and a DC system are mixed, the control devices 300 of a plurality of types are present with an LRT and a DC/DC converter being mixed.

The device information transmission unit 7 of the control device 300 transmits the device information stored in the device information storage unit 6 to the system control device 200.

The time constant reception unit 8 of the control device 300 receives the adjustment time constant of the control device 300 transmitted from the system control device 200.

The time constant adjustment unit 9 of the control device 300 updates the time constant of the control device 300 based on the adjustment time constant received by the time constant reception unit 8. Next, a flow of processes of the system control device 200 according to Embodiment 1 will be described with reference to the flowcharts of FIGS. 2, 3, and 4.

FIG. 2 is a flowchart illustrating a flow of processes for adjustment time constant calculation of the system control device 200 according to Embodiment 1. This flowchart illustrates the processes from receiving the device information from the control device 300, determining hunting has occurred or not, to calculating an adjustment time constant. Although not clearly illustrated in the flowchart, this processing is repeatedly operated when the hunting determination unit 2 determines that no hunting has occurred in one or more control devices 300. In Embodiment 1, the adjustment time constant is calculated taking the deterioration progress degree into consideration.

Figure 3:
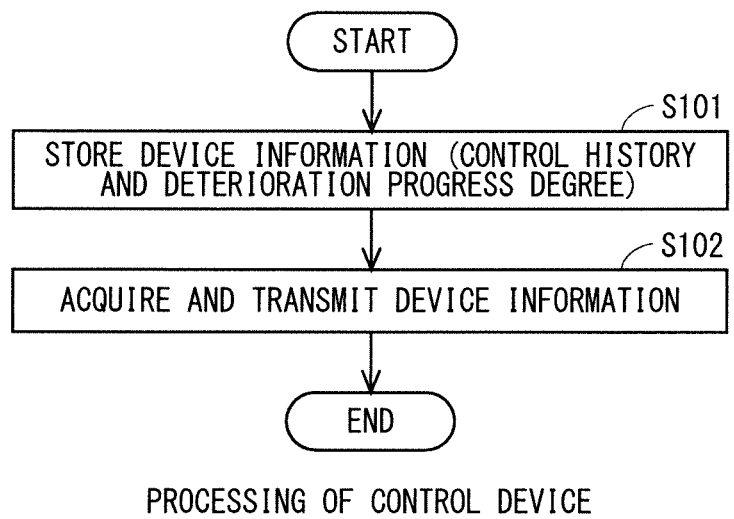
FIG. 3 A flowchart illustrating a flow of processes until a process the control device according to Embodiment 1 transmits device information to the system control device.

FIG. 3 is a flowchart illustrating a flow of processes until a process a control device 300 according to Embodiment 1 transmits the device information to the system control device 200.

Figure 4:
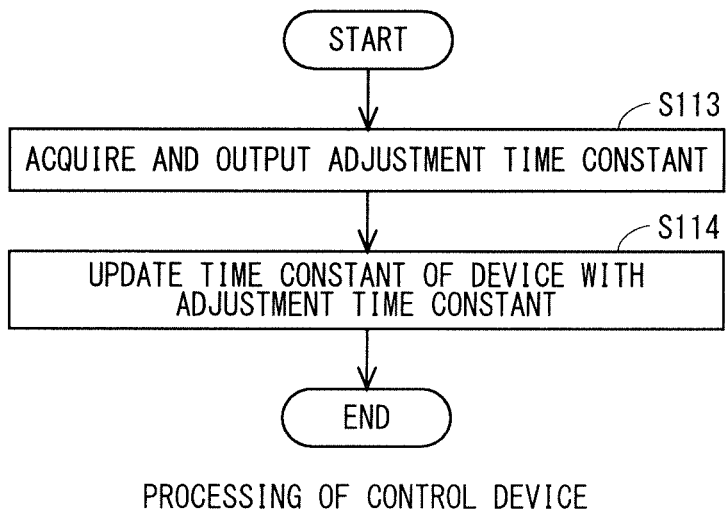
FIG. 4 A flowchart illustrating a flow of processes from a process after the control device according to Embodiment 1 receives an adjustment time constant from the system control device.

FIG. 4 is a flowchart illustrating a flow of processes from a process after the control device 300 according to Embodiment 1 receives the adjustment time constant from the system control device 200.

In the control device 300, the device information storage unit 6 stores the device information of the control device 300 such as the control history, the deterioration progress degree and the like (Step S101). The device information transmission unit 7 acquires the stored device information and transmits the information to the system control device 200 (Step S102).

Next, in the system control device 200, the device information reception unit 1 receives the device information transmitted from each control device 300, and outputs the received device information to the hunting determination unit 2 and the device rank calculation unit 3 (Step S103). The control information is received again when the time constant of the control device 300 is updated with the calculated adjustment time constant.

The hunting determination unit 2 acquires each device information, determines whether or not hunting has occurred in each control device 300 based on the control history of the acquired device information, and outputs the determination result to the device rank calculation unit 3 and the time constant calculation unit 4 (Step S104).

The device rank calculation unit 3 acquires the device information and the hunting determination result (Step S105), and when the hunting determination result indicates that the determination that hunting has occurred in one or more of each control device 300 has made, the device rank calculation unit 3 ranks the control devices 300 in the order of progression of the deterioration progress degree (Step S106).

Meanwhile, when the device rank calculation unit 3 determines that the hunting determination result indicates that no hunting has occurred in one or more control devices 300, the device rank calculation unit 3 ranks the control devices 300 in the reversed order of progression of the deterioration progress degree. The device rank calculation unit 3 outputs the device rank order to the time constant calculation unit 4 (Step S108). In Embodiment 1, ranking when hunting has occurred and when no hunting has occurred is reversed, the methods are not limited thereto. However, ranking may be the same and, as described below, the order of selection of the control device 300 by the time constant calculation unit 4 may be reversed. The methods are not limited. When the ranking is the same, reference of the hunting determination result is not required in Step S107.

The time constant calculation unit 4 acquires the hunting determination result and the device rank (Step S109) and when the hunting determination result is the one determined that hunting has occurred in one or more control devices, the time constant calculation unit 4 calculates the adjustment time constant in which the time constant of the control device 300 selected according to the acquired rank order is increased. Specifically, an adjustment time constant obtained by increasing the time constant of the control device 300 having the highest rank order of deterioration progress degree by a predetermined time is calculated (Step S110).

Here, although the deterioration progress degrees are ranked in the order of progression when the hunting result is the one determined that hunting has occurred in one or more devices to increase the time constant of the control device 300 having the highest rank order of deterioration progress degree by a predetermined time, the method is not limited thereto, the method of determining the control device 300 having the most progressed deterioration progress degree is not limited.

Also, although based on the rank order of deterioration progress degree that has been assigned when it is determined that hunting has occurred in one or more control devices 300, the device rank calculation unit 3 calculates an adjustment time constant of the control device 300 having the highest rank order, it is not limited thereto, and it may also control such that the adjustment time constant is calculated by selecting the control device 300 having the progressed deterioration progress degree (state information with a high significance level) without calculating the rank order. In this case, it is even more preferable to select the control device 300 having the highest deterioration progress degree (state information with the highest significance level) and control to calculate the adjustment time constant.

Meanwhile, when it is determined that no hunting has occurred in one or more control devices 300, the time constant calculation unit 4 calculates an adjustment time constant obtained by decreasing the time constant of the control device 300 having the highest rank order of the deterioration progress degree calculated when it is determined that no hunting has occurred in one or more control devices 300 by a predetermined time (Step S111).

Here, although, when it is determined that no hunting has occurred in one or more control devices 300, the time constant calculation unit 4 ranks the deterioration progress degrees in ascending order and decreases the time constant of the control device 300 having the highest rank order of the deterioration progress degree by a predetermined time, the method is not limited thereto, the method of determining the control device 300 having the least progressed deterioration progress degree is not limited. For example, in the device rank calculation unit 3, ranking methods when hunting has occurred and when no hunting has occurred, may be the same and control is performed so as to decrease the time constants of the control devices 300 in the reversed order of this rank order.

Also, although based on the rank order of deterioration progress degree that has been assigned when it is determined that no hunting has occurred in one or more control devices 300, the device rank calculation unit 3 calculates an adjustment time constant of the control device 300 having the highest rank order, it is not limited thereto, and it may also control such that the adjustment time constant is calculated by selecting the control device 300 having the less progressed deterioration progress degree (state information with a low significance level) without calculating the rank order. In this case, it is even more preferable to select the control device 300 having the least progressed deterioration progress degree (state information with the lowest significance level) and control to calculate the adjustment time constant.

The time constant calculation unit 4 outputs the adjustment time constant calculated for each control device 300 to the time constant transmission unit 5. The time constant transmission unit 5 acquires the adjustment time constant of each control device 300, transmits the adjustment time constant to the control device 300 to have the time constant of the control device 300 updated (Step S112).

Finally, in the control device 300, the time constant reception unit 8 receives the adjustment time constant transmitted from the system control device 200, and outputs the received adjustment time constant to the time constant adjustment unit 9 (Step S113). The time constant adjustment unit 9 acquires the adjustment time constant, and updates the time constant of the control device 300 based on the acquired adjustment time constant (Step S114).

When the control information is received from the control device 300 every time the time constant of the control device 300 is updated with the adjustment time constant, the hunting determination unit 2 further determines whether hunting has occurred or not, and the processing of FIG. 2 is repeated.

In this repeating processing, the time constant calculation unit 4 may control such that, every time the hunting determination unit 2 determines that hunting has occurred in one or more of the control devices 300, the time constant calculation unit 4 calculates the adjustment time constants in which the time constants are increased in the order of progression of the deterioration progress degree of the control devices 300 (state information with a high significance level), and every time the hunting deterioration unit 2 determines that no hunting has occurred in one or more of the control devices 300, the time constant calculation unit 4 calculates an adjustment time constant in which the time constants are decreased in the reversed order of progression of the deterioration progress degree of the control devices 300 (state information with a low significance level).

The time constant transmission unit 5 transmits the calculated adjustment time constant to the corresponding control device 300, and updates the time constant of the control device 300 every time the adjustment time constant is calculated. in this manner, calculation and updating of the adjustment time constant may be continued in turn.

In Embodiment 1, although the adjustment time constant is calculated by increasing or decreasing by a predetermined time, the calculation is not limited thereto, and the method of increasing is not limited. Further, in the case where the time constant is decreased, the time constant may be decreased, and the method of decreasing is not limited.

Further, in Embodiment 1, although, control is performed so as to change the time constant of the control device 300 having the highest rank order of the deterioration progress degree, a case where the control device 300 to be controlled not being the highest rank can be conceivable. For example, a case can be conceivable in which the upper limit value and the lower limit value of the time constant for each control device 300 are stored in the device information storage unit 6, and when the adjustment time constant to be calculated falls below the stored lower limit value or exceeds the stored upper limit value when changing the time constant of the control device 300 with the highest device rank, the time constant of the control device 300 of the next rank is changed.

In Embodiment 1, although, control is performed such that the time constant of the control device 300 having the highest degree of deterioration progress degree is changed in order, the time constants of a plurality of control devices 300 are weighted by the rank order can be performable as a variation. For example, it can be conceivable in that for the control device 300 with the highest device rank, the time constant is changed by 3 seconds, for the control device 300 with the second highest rank, the time constant is changed by 2 seconds, and for the control device 300 with the third highest rank, the time constant is changed by 1 second.

In Embodiment 1, although, control is performed so as to increase the time constant for the higher deterioration progress degree, it is also conceivable to control so that the time constant is increased for the smaller time constant. However, the degree of progress of deterioration depends on factors other than the number of operations; therefore, in Embodiment 1, the time constant is adjusted by referring to the deterioration progress degree alone.

Figure 5:
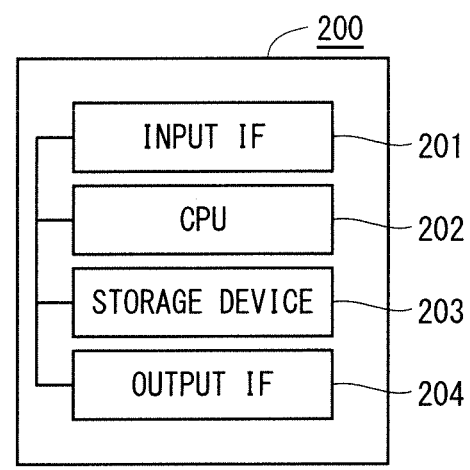
FIG. 5 A hardware configuration diagram illustrating a configuration of the system control device.

FIG. 5 is a hardware configuration diagram illustrating a configuration of the system control device 200. The system control device 200 includes an input interface 201, a Central Processing Unit (CPU) 202, a storage device 203, and an output interface 204. An interface is hereinafter referred to as IF.

The adjustment time constant is stored in the storage device 203, and the functions of the hunting determination unit 2, the device rank calculation unit 3, the time constant calculation unit 4, and the like are realized by executing a program by the CPU 202. The device information reception unit 1 includes an input IF. The time constant transmission unit 5 includes an output IF, and the created adjustment time constant is output from the output IF.

The IF includes a wired port such as a cable port, a USB port, a direct connection port, and a wireless network port. The storage device 203 includes a storage medium such as an HDD, an SSD, and a flash memory.

As described above, in Embodiment 1, the deterioration progress degree of the control device 300 is stored in the device information storage unit 6, and the device rank calculation unit 3 ranks the control devices 300 based on the deterioration progress degree of each control device 300. The time constant calculation unit 4 selects the control device 300 which is the target for the change of the time constant and calculates the adjustment time constant of the control device 300 based on the calculated device order. Accordingly, in the whole system, deterioration due to load deviation on a specific control device 300 is suppressed from becoming fast while suppressing hunting in each control device 300.

Embodiment 2

Although Embodiment 2 has the same configuration as that of FIG. 1, the difference lies in that the device rank calculation unit 3 ranks the control devices 300 based on the power loss. In that case, as device information to be stored in the device information storage unit 6, a power loss generated when power is converted in the LRT or the DC/DC converter may be stored. This power loss may be calculated from the device information. The calculation of the power loss may be executed by the control device 300 or may be executed by the system control device 200, and is not limited to either device.

From the viewpoint of reducing operational costs, it is desirable to prevent deviation that further increases the number of operations of a control device 300 with large power loss. In Embodiment 2, the deviation that increases the time constant of the specific control device 300 excessively can be prevented.

The power loss of the control device 300 can be obtained from the power converted by the control device 300 and the power loss characteristic of the control device 300. The power loss characteristic is, for example, a relationship between power to be converted and power loss to be generated at that time. In general, it is represented by a quadratic function $ap^2+bp+c$ ($a>0$, $c>0$) of the power p to be converted; therefore, the power loss increases as the power to be converted increases.

A method of calculating the device rank of the device rank calculation unit 3 will be described. In the device rank calculation unit 3, as in Embodiment 1, the device rank is calculated for each of the control devices 300 in the case where it is determined that hunting has occurred even in one device, and in the case where it is determined that no hunting has occurred even in one device, respectively. In the following, it is assumed that the power loss of the control device j at the current time T is $p(j)$.

First, in the case where it is determined that hunting has occurred in one or more of the control device 300, the highest priority is to suppress hunting. To this end, the time constant of the control device 300 need be increased. The control devices 300 are ranked in the order in which power loss $p(j)$ is in descending order, and giving the priority to the control device 300 having higher rank, the time constant is increased; therefore, it is expected that the deviation which further increases the power loss of the control device 300 having a large power loss $p(j)$ is prevented while suppressing the hunting.

Next, consider a case where it is determined that no hunting has occurred in one or more control devices 300. In this case, it is desirable to decrease the time constant as small as possible in the range where no hunting occurs. The control devices 300 are ranked in the order in which power loss $p(j)$ is in ascending order, and giving the priority to the control device 300 having higher rank, the time constant is decreased; therefore, it is expected that increase in the power loss $p(j)$ occurs readily and, in the whole system, suppression in increase in the power loss $p(j)$.

A method of system control employed in the system control device 200 according to Embodiment 2 will be described with reference to FIG. 1, FIG. 2, FIG. 6, FIG. 7, and FIG. 8.

Figure 6:
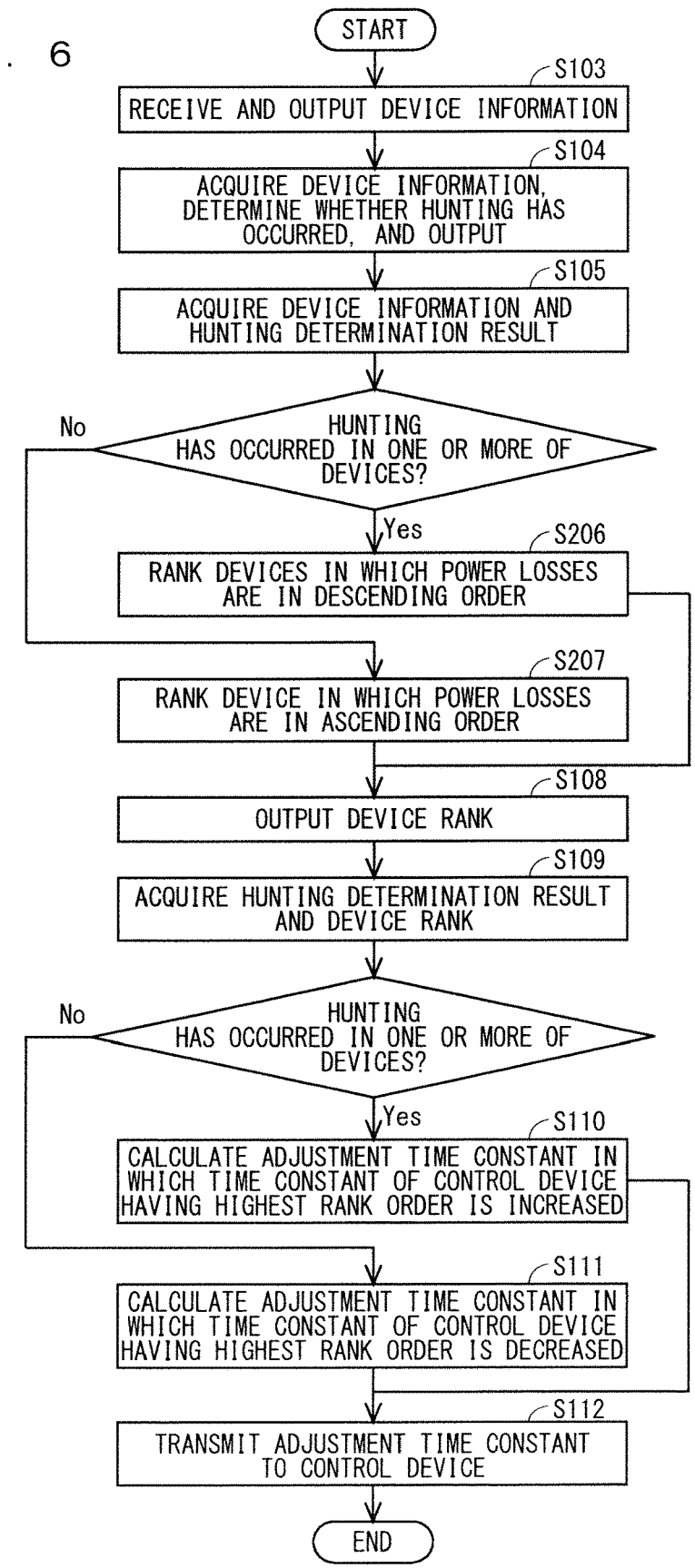
FIG. 6 A flowchart illustrating a flow of processes for adjustment time constant calculation of the system control device according to Embodiment 2.

FIG. 6 is a flowchart illustrating a flow of processes for adjustment time constant calculation of the system control device 200 according to Embodiment 2. In Embodiment 2, the adjustment time constant is calculated taking the power loss into consideration.

Figure 7:
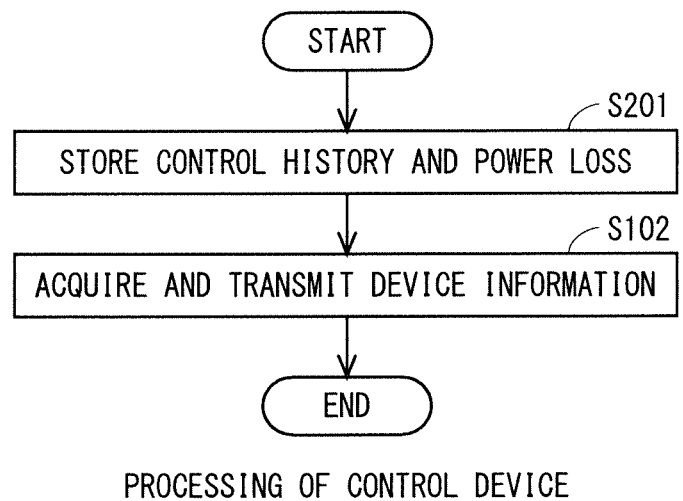
FIG. 7 A flowchart illustrating a flow of processes until a process the control device according to Embodiment 2 transmits device information to the system control device.

FIG. 7 is a flowchart illustrating a flow of processes until a process a control device 300 according to Embodiment 2 transmits the device information to the system control device 200.

Figure 8:
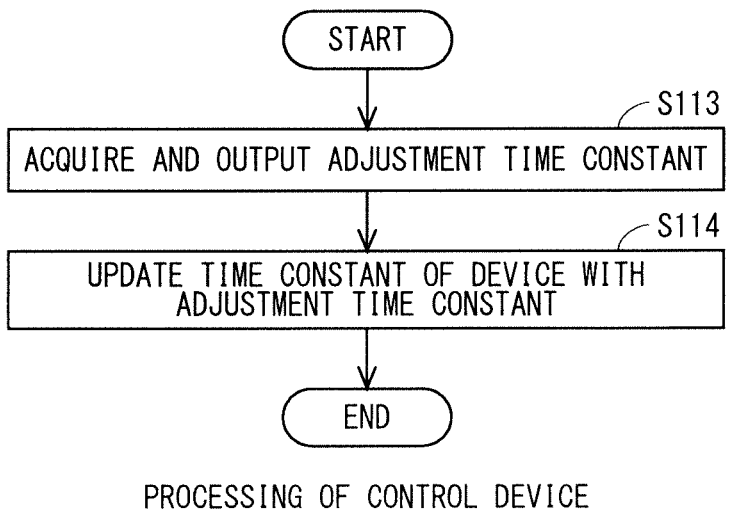
FIG. 8 A flowchart illustrating a flow of processes from a process after the control device according to Embodiment 2 receives an adjustment time constant from the system control device.

FIG. 8 is a flowchart illustrating a flow of processes from a process after the control device 300 according to Embodiment 2 receives the adjustment time constant from the system control device 200.

In the flowcharts of FIG. 6, FIG. 7, and FIG. 8, for Steps S102 to S105 and Steps S108 to S114 in the flowchart shown in FIG. 2, FIG. 3, and FIG. 4 of Embodiment 1, the same processing as in Embodiment 1 are used; therefore, the same reference numerals as those in FIG. 2, FIG. 3, and FIG. 4 are attached, and the processes in Step S201, Step S206, and Step S207 are different from those in Embodiment 1.

In Step S101 of Embodiment 1, the control device 300 stores the control history and the deterioration progress degree in the device information storage unit 6. Whereas, in Step S201 of Embodiment 2, the control device 300 stores the control history and the power loss in the device information storage unit 6. Here, although the power loss is stored by the control device 300 side, Embodiment 2 is not limited thereto, and control may be performed so that the system control device 200 calculates from information such as the control history.

Next, in Step S106 of Embodiment 1, the device rank calculation unit 3 ranks the control devices 300 in the order of progression of the deterioration progress degree. Whereas, in Step S206 of Embodiment 2, the device rank calculation unit 3 ranks the control devices 300 in the order of larger power loss.

In Step S107 of Embodiment 1, the device rank calculation unit 3 ranks the control devices 300 in the reversed order of progression of the deterioration progress degree. Whereas, in Step S207 of Embodiment 2, the device rank calculation unit 3 ranks the control devices 300 in the order of smaller power loss. As described in Embodiment 1, ranking is not limited, and any method can be employed that controls to increase the time constant of the control device 300 having a larger power loss and to decrease the time constant of the control device 300 having a smaller power loss.

As described above, in Embodiment 2, the power loss of the control device 300 is stored in the device information storage unit 6, and the device rank calculation unit 3 ranks the control devices 300 based on the power loss of each control device 300. The time constant calculation unit 4 calculates the time constant of each control device 300 based on the calculated device order. In Embodiment 2, the parts different from Embodiment 1 have been described. The other parts are the same as in Embodiment 1. Accordingly, in the whole system, deviation in power loss is suppressed while suppressing hunting in each control device 300.

Embodiment 3

Figure 9:
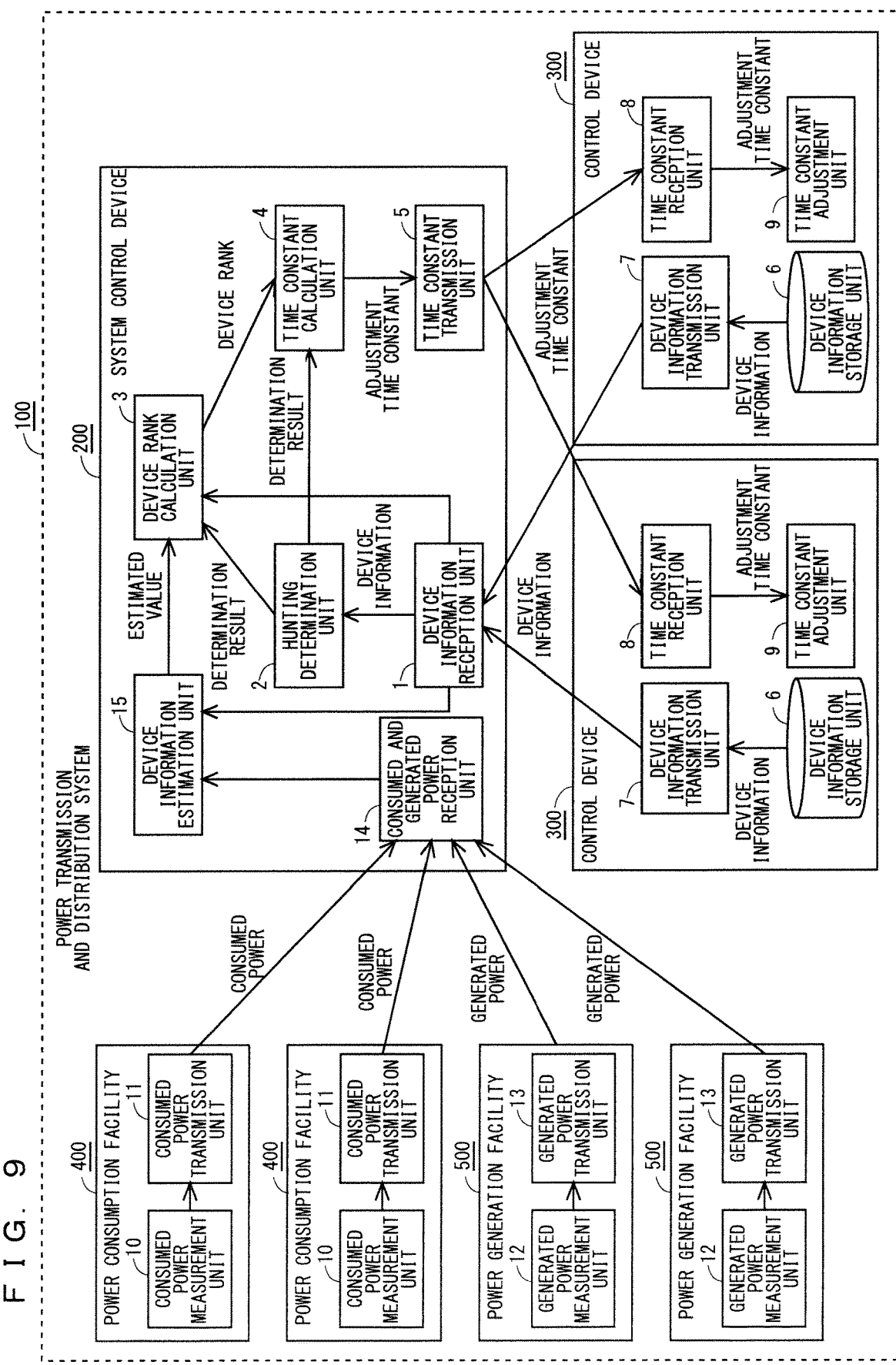
FIG. 9 A block diagram illustrating a configuration example of a system control device according to Embodiment 3.

FIG. 9 is a block diagram illustrating one configuration example of a system control device 200 according to Embodiment 3. Embodiment 3 differs from other Embodiments in that the power transmission and distribution system 100 includes a power consumption facility 400 and a power generation facility 500 and that a power loss estimation value is calculated. In FIG. 9, the same components as those in Embodiment 1 illustrated in FIG. 1 are denoted by the same reference numerals, and detailed description thereof is omitted.

In addition to the configuration illustrated in FIG. 1, the power transmission and distribution system 100 according to Embodiment 3 includes the power consumption facility 400 including a consumed power measurement unit 10 and a consumed power transmission unit 11, the power generation facility 500 including a generated power measurement unit 12 and a generated power transmission unit 13, a consumed and generated power reception unit 14 that receives information such as the power consumed by the system control device 200 in the power consumption facility 400 and the power generated in the power generation facility 500 such as solar power generation, and a device information estimation unit 15 that estimates the power loss when the time constant of the control device 300 is changed based on information of the control device 300, the power consumption facility 400, and the power generation facility 500.

The power consumption facility 400 indicates, for example, a house or factory that consumes power. The power generation facility 500 indicates, for example, a photovoltaic power generation system. The consumed power measurement unit 10 measures the consumed power consumed by the power consumption facility 400.

The consumed power transmission unit 11 transmits the consumed power measured by the consumed power measurement unit 10 to the system control device 200. The generated power measurement unit 12 measures the power generated in the power generation facility 500. The generated power transmission unit 13 transmits the generated power measured by the generated power measurement unit 12 to the system control device 200. The consumed and generated power reception unit 14 receives the consumed power transmitted from each power consumption facility 400 and the generated power transmitted from each power generation facility 500.

The device information estimation unit 15 calculates an estimated value of the power loss of the entire system based on the device information received by the device information reception unit 1 and the consumed power and generated power received by the consumed and generated power reception unit 14.

In the following, it is assumed that the time constant of the control device j at the current time T is c(j). When only for the control device j', the time constant is set to c(j')+C by increasing, from the time constant c(j') by predetermined time C seconds and for the control device j other than j', the time constant c(j) is set, the power loss estimation value for the entire transmission and distribution system is set to p(j',C). Also, when only for the control device j', the time constant is set to c(j')-C by decreasing, from the time constant c(j') by the predetermined time C seconds and for the control device j other than j', the time constant c(j) is set, the power loss estimation value for the entire transmission and distribution system is set to p(j',-C).

In the device information estimation unit 15, the power loss estimation value p(j',C) and the power loss estimation value p(j',-C) are calculated for each control device 300, and the values are used in rank calculation by the device rank calculation unit 3. Regarding the calculation of the power loss estimation value of the entire system, for example, the power loss is calculated by power flow calculation, which is a known calculation method, for the entire system based on the generated power and the consumed power.

Due to the change in the configuration, the method of calculating the device rank by the device rank calculation unit 3 is different from those in Embodiments 1 and 2. The device rank calculation unit 3 calculates rank order for determining determine the time constants of respective control devices 300 so that the power loss is reduced while suppressing the hunting of each control device 300 based on the device information received by the device information reception unit 1 a determination result of the hunting determination unit 2, and the power loss estimation value calculated by the device information estimation unit 15.

First, in the case where it is determined that hunting has occurred in one or more of the control devices 300, the highest priority is to suppress hunting. To this end, the time constant of the control device 300 need be increased. The device rank calculation unit 3 calculates the rank order of the control devices 300 so that the power loss estimation values p'(j',C) are in the ascending order, based on the power loss estimation values p'(j',C) calculated by the device information estimation unit 15.

Next, the time constant calculation unit 4 calculates the time constant of each control device 300 based on the determination result of the hunting determination unit 2 and the rank order for determining the time constant of each control device 300 calculated by the device rank calculation unit 3. When hunting has occurred, the time constant of the control device 300 having the highest device rank is increased by the predetermined time C seconds. Giving the priority to the control device 300 having the higher rank, the time constant is increased; therefore, the power loss is reduced while the hunting is suppressed. That is, the adjustment time constant is calculated by increasing the time constant of the control device when the power estimation value is the smallest by the predetermined time C seconds. Although the smallest is the case here, it is not limited thereto, and any case as long as it becomes smaller may be applied.

Next, consider a case where it is determined that no hunting has occurred in one or more control devices 300. In this case, it is desirable to decrease the time constant as small as possible in the range where no hunting occurs. The device rank calculation unit 3 calculates the rank order of the control devices 300 so that the power loss estimation values p'(j',–C) are in the ascending order, based on the power loss estimation values p'(j',–C) calculated by the device information estimation unit 15.

Next, the time constant calculation unit 4 calculates the time constant of each control device 300 based on the determination result of the hunting determination unit 2 and the rank order for determining the time constant of each control device 300 calculated by the device rank calculation unit 3. When no hunting has occurred, the time constant of the control device 300 having the highest device rank is decreased by the predetermined time C seconds. Giving the priority to the control device 300 having the higher rank, the time constant is decreased; therefore, the power loss can be reduced. That is, the adjustment time constant is calculated by decreasing the time constant of the control device when the power estimation value is the smallest by the predetermined time C seconds. Although the smallest is the case here, it is not limited thereto, and any case as long as it becomes smaller may be applied.

A method of system control employed in the system control device 200 according to Embodiment 3 will be described with reference to FIG. 10, FIG. 11, FIG. 12, FIG. 13, and FIG. 14.

Figure 10:
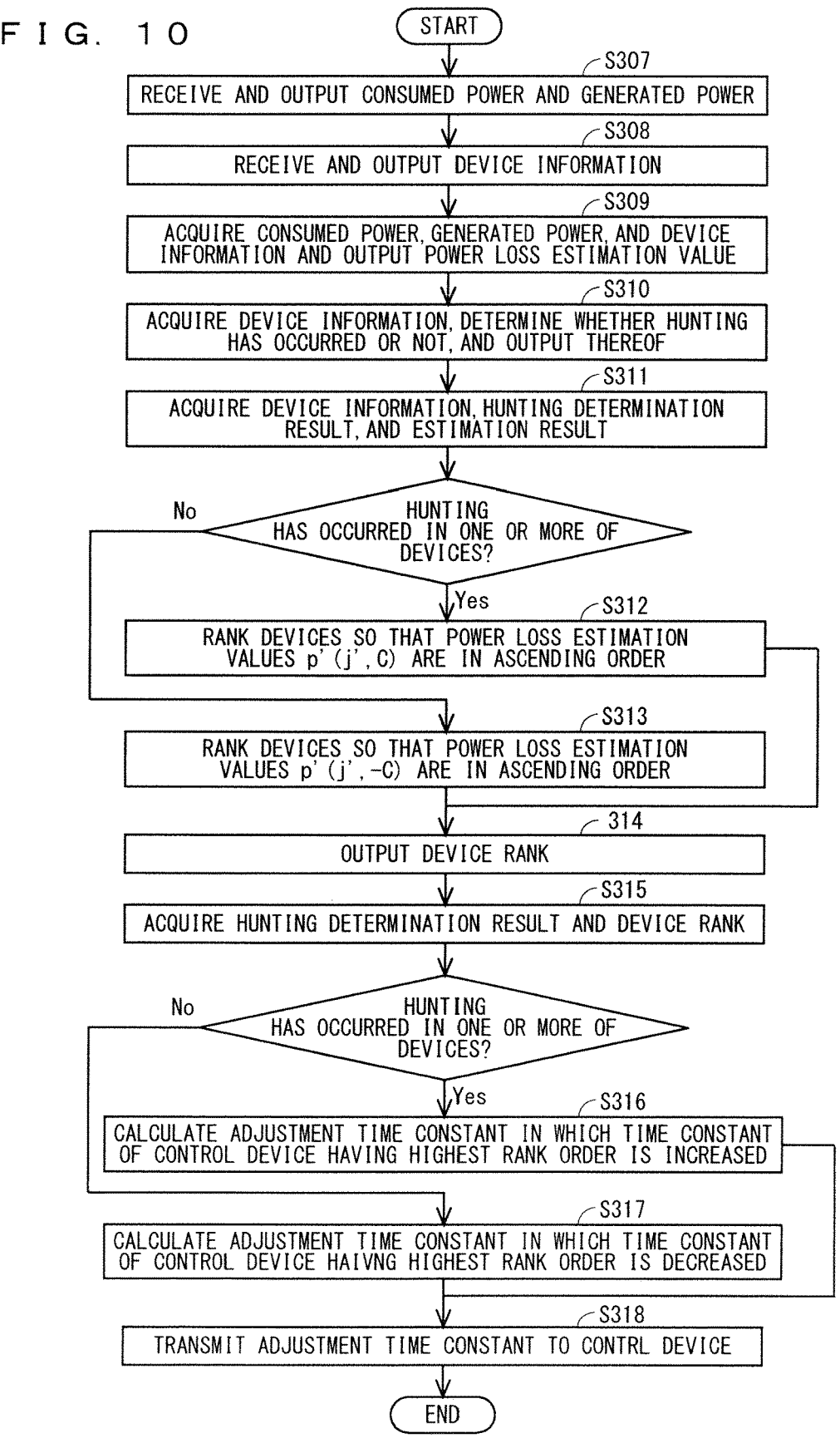
FIG. 10 A flowchart illustrating a flow of processes for adjustment time constant calculation of the system control device according to Embodiment 3.

FIG. 10 is a flowchart illustrating a flow of processes for adjustment time constant calculation of the system control device 200 according to Embodiment 3. In Embodiment 3, the adjustment time constant is calculated taking the power loss estimation value in a power transmission and distribution system including a power consumption facility and a power generation facility into consideration.

Figure 11:
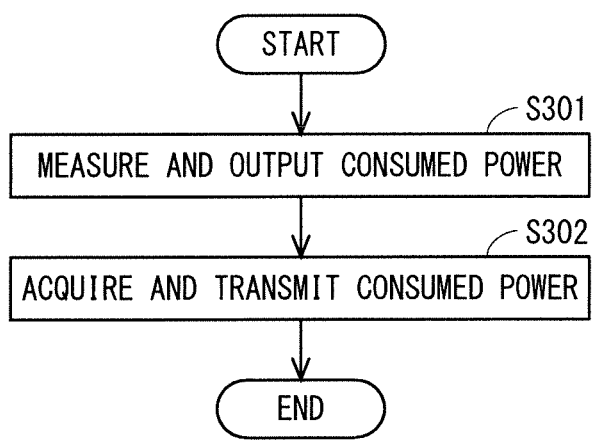
FIG. 11 A flowchart illustrating a flow of processes until a process a power consumption facility according to Embodiment 3 transmits consumed power to the system control device.

FIG. 11 is a flowchart illustrating a flow of processes until a process the power consumption facility 400 according to Embodiment 3 transmits consumed power to the system control device 200.

Figure 12:
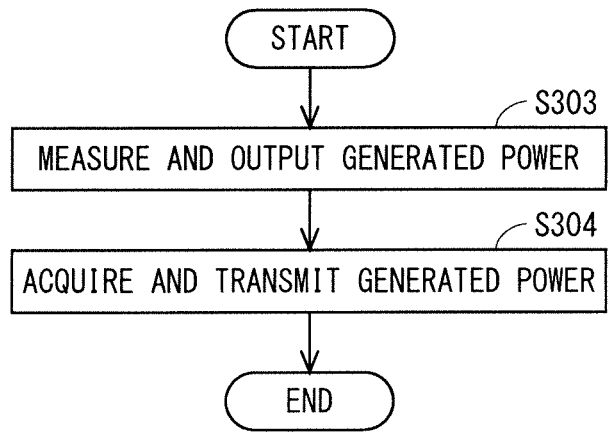
FIG. 12 A flowchart illustrating a flow of processes until a process a power generation facility according to Embodiment 3 transmits generated power to the system control device.

FIG. 12 is a flowchart illustrating a flow of processes until a process the power generation facility 500 according to Embodiment 3 transmits generated power to the system control device 200.

Figure 13:
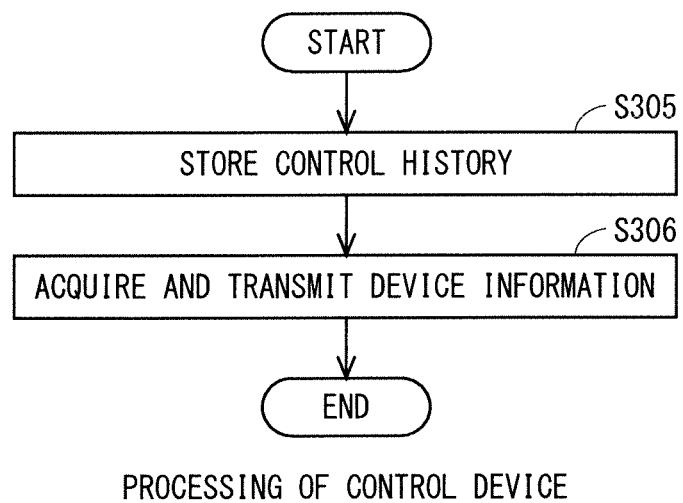
FIG. 13 A flowchart illustrating a flow of processes until a process a control device according to Embodiment 3 transmits device information to the system control device.

FIG. 13 is a flowchart illustrating a flow of processes until a process the control device 300 according to Embodiment 3 transmits device information to the system control device 200.

Figure 14:
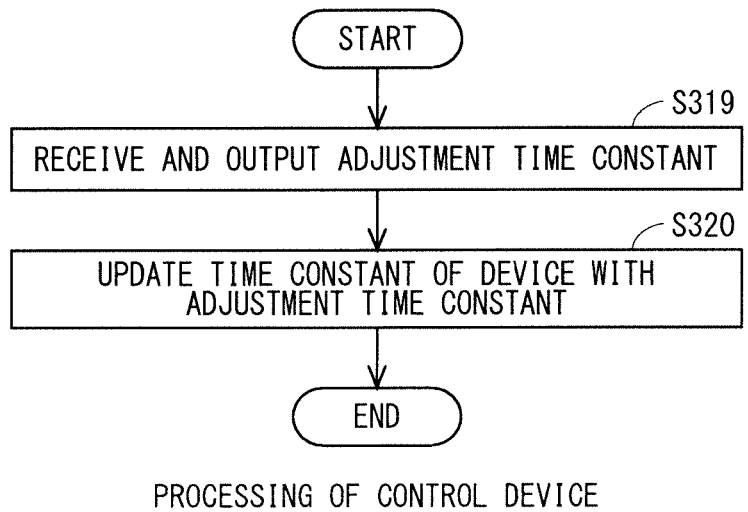
FIG. 14 A flowchart illustrating a flow of processes from a process after the control device according to Embodiment 3 receives an adjustment time constant from the system control device.

FIG. 14 is a flowchart illustrating a flow of processes from a process after the control device 300 according to Embodiment 3 receives an adjustment time constant from the system control device 200.

In the power consumption facility 400, a consumed power measurement unit 10 measures the consumed power of the power consumption facility 400 and outputs the consumed power to a consumed power transmission unit 11 (Step S301). The consumed power transmission unit 11 acquires the measured consumed power and transmits the consumed power to the system control device 200 (Step S302).

In the power generation facility 500, the generated power measurement unit 12 measures the generated power of the power generation facility 500 and outputs the generated power to the generated power transmission unit 13 (Step S303). The generated power transmission unit 13 acquires the measured generated power and transmits the measured generated power to the system control device 200 (Step S304).

In the control device 300, the control device 300 stores the control history in the device information storage unit 6 (Step S305). The device information transmission unit 7 acquires the stored device information and transmits the information to the system control device 200 (Step S306).

Next, in the system control device 200, the consumed and generated power reception unit 14 receives the consumed power transmitted from each power consumption facility 400 and the generated power transmitted from each power generation facility 500, and outputs the received information on the consumed power and generated power to the device information estimation unit 15 (Step S307). The device information reception unit 1 receives the device information transmitted from each control device 300, and outputs the received device information to the device information estimation unit 15, the hunting determination unit 2, and the device rank calculation unit 3 (Step S308).

The device information estimation unit 15 acquires the consumed power, the generated power, the device information, and based on the acquired information, calculates the power loss estimation value when the time constant of a certain control device 300 is increased by a certain time and the power loss estimation value when the time constant of a certain control device 300 is decreased by a certain time for each control device 300, and outputs the estimation result to the device rank calculation unit 3 (Step S309).

The hunting determination unit 2 acquires device information, determines whether or not hunting has occurred in each control device 300 based on the acquired device information, and outputs the determination result to the device rank calculation unit 3 and the time constant calculation unit 4 (Step S310).

The device rank calculation unit 3 acquires the device information and hunting determination result (Step S311), and when the hunting determination result indicates that hunting has occurred in one or more control devices 300, based on the acquired estimation result, calculates the power loss estimation value p'(j',C) when the time constant of a control device 300 is increased by a certain time for each control device, and ranks the control devices 300 in the order in which the power loss estimation values p'(j',C) are in ascending order (Step S312).

Meanwhile, when the hunting determination result indicates that no hunting has occurred in one or more control devices 300, based on the acquired estimation result, the device rank calculation unit 3 calculates the power loss estimation value p'(j',–C) when the time constant of a control device 300 is decreased by a certain time for each control device, and ranks the control devices 300 in the order in which the power loss estimation values p'(j',–C) are in ascending order (Step S313). The device rank calculation unit 3 outputs the device rank to the time constant calculation unit 4 (Step S314).

The time constant calculation unit 4 acquires the hunting determination result and the device rank (Step S315), and when the hunting determination result indicates that hunting has occurred in one or more devices, increases the time constant of the control device 300 having the highest device rank by a predetermined time (Step S316). Here, "having the highest device rank" means the smallest power loss estimation value.

Meanwhile, when the hunting determination result indicates that no hunting has occurred in all the control devices 300, the time constant calculation unit 4 decreases the time constant of the control device 300 having the highest device rank by a predetermined time (Step S317). The time constant calculation unit 4 outputs the time constant of each control device 300 to the time constant transmission unit 5. The time constant transmission unit 5 acquires the time constant of each control device 300, and transmits the time constant to each control device 300 to have the time constant updated (Step S318). Here, "having the highest device rank" means the smallest power loss estimation value.

Finally, in the control device 300, the time constant reception unit 8 receives the time constant transmitted from the system control device 200, and outputs the received time constant to the time constant adjustment unit 9 (Step S319). The time constant adjustment unit 9 acquires the time constant, and updates the time constant of the control device 300 based on the acquired time constant (Step S320).

As described above, in Embodiment 3, the power consumption facility 400 includes the consumed power measurement unit 10 and the consumed power transmission unit 11. The power generation facility 500 includes the generated power measurement unit 12 and the generated power transmission unit 13. Then, the system control device 200 receives information on the power consumed by the power consumption facility 400 and the power generated by the power generation facility 500 such as photovoltaic power generation in the consumed and generated power reception unit 14.

The device information estimation unit 15 estimates the power loss of the entire power transmission and distribution system 100 when the time constant of the control device 300 is changed based on the information of the control device 300, the power consumption facility 400, and the power generation facility 500. The device rank calculation unit 3 calculates the rank order for determining the time constant of the control device 300 based on the power loss estimation value calculated by the device information estimation unit 15.

Accordingly, adjustment of the time constant of each control device 300 so as to reduce the power loss based on the power loss estimation value of the entire power transmission and distribution system 100 is ensured while suppressing hunting of each control device 300. In Embodiment 3, the parts different from Embodiment 1 have been described. The other parts are the same as in Embodiment 1.

Embodiment 4

Although Embodiment 4 has the same configuration as that of FIG. 1, the difference lies in that the time constant calculation unit 4 calculates the adjustment time constant based on an increase rate of the deterioration progress degree representing how many deterioration progress degrees of each control devices 300 are increased from the deterioration progress degree at a reference time. In the configuration of Embodiment 4, the device rank calculation unit 3 ranks the control devices 300, and based on the rank order, the time constant calculation unit 4 calculates the adjustment time constant. However, Embodiment 4 is not limited thereto, instead, the time constant calculation unit 4 may be controlled to directly calculate the adjustment time constant based on the increase rate of the deterioration progress degree.

In Embodiment 1, deterioration due to load deviation on a specific control device 300 is suppressed from becoming fast while suppressing hunting in each control device 300, however, leveling the deterioration progress degrees may cause failures in multiple devices at the same time. In Embodiment 4, by leveling the increase rates of the deterioration progress degrees, the deterioration progress degree of each control device 300 takes a value close to the deterioration progress degree at the reference time.

Here, the deterioration progress degree at the reference time is referred to as a deterioration progress degree reference value. The deterioration progress degree reference value is represented by the following expression with an operation period from the start of operation to the reference time, an operation target period represented by the durable hours of the device, and a deterioration progress degree target value represented by the deterioration progress degree when the operation target period from the start of operation has elapsed. Deterioration progress degree reference value=(Operation period/Operation target period)×Deterioration progress degree target value The reference time may be the time when the deterioration progress degree reference value is calculated, and is not limited. The reference time is a reference time for observing the increase rate in the deterioration progress degree; therefore it is not limited thereto and may be a predetermine time as long as it is set before the deterioration progress degree is acquired when the hunting determination unit 2 determines the hunting. Further, the deterioration progress degree target value refers to the deterioration progress degree when the control device 300 has passed the operation target period, and it is not limited and may be an actual measurement value of the control device 300 or a predicted value.

When at the start of operation, the operation period is 0, so the deterioration progress degree reference value is 0. When X % of the operation target period has elapsed from the start of operation, the operation period is (X/100)× operation target period, therefore, the deterioration progress degree reference value is (X/100)×deterioration progress degree target value. Further, when the operation target period has elapsed from the start of operation, the operation period becomes equal to the operation target period, therefore, the deterioration progress degree reference value becomes equal to the deterioration progress degree target value.

Further, the increase rate of the deterioration progress degree is defined by the following expression with the deterioration progress degree, the deterioration progress degree reference value, and the deterioration progress degree target value. Increase rate of the deterioration progress degree=(deterioration progress degree-deterioration progress degree reference value)/deterioration progress degree target value. The increase rate of the deterioration progress degree refers to the increase rate from the deterioration progress degree reference value. Further, the deterioration progress degree in this calculation formula is acquired when the hunting determination unit 2 determines hunting. That is, the deterioration progress degree in this calculation formula means the deterioration progress degree at the time when hunting determination is performed.

The calculation of deterioration progress degree reference value and the increase rate may be executed by the control device 300 or may be executed by the system control device 200 by storing the operation start time, the operation target period, and the deterioration progress degree target value in the device information storage unit 6, and is not limited to either device. If the operation start time of each control device 300 is shifted or the operation target period is shifted, failure in a plurality of devices at the same time can be prevented.

A method of calculating the device rank by the device rank calculation unit 3 will be described. In the device rank calculation unit 3, as in Embodiment 1, the device rank is calculated for each of the control devices 300 in the case where it is determined that hunting has occurred even in one device, and in the case where it is determined that no hunting has occurred even in one device, respectively. Hereinafter, the deterioration progress degree target value of the control device j is set to t(j), the deterioration progress degree of the control device j at time T when hunting determination is performed is set to d(j), and the deterioration progress degree reference value is set to r(j).

First, in the case where it is determined that hunting has occurred in one or more of the control device 300, the highest priority is to suppress hunting. To this end, the time constant of the control device 300 need be increased. The control devices 300 are ranked so that (d(j)−r(j))/t(j), which is the increase rate of the deterioration progress degree, is in the descending order, that is, the order of increase rates of deterioration progress degrees are in the descending order. Giving the priority to the control device having the higher rank, the time constant is increased; therefore, it is expected that (d(j)−r(j))/t(j) will be suppressed from being increased while the hunting is suppressed, and the increase rates will be leveled.

Next, consider a case where it is determined that no hunting has occurred in one or more control devices 300. In this case, it is desirable to decrease the time constant as small as possible in the range where no hunting occurs. The control devices 300 are ranked so that (d(j)−r(j))/t(j), which is the increase rate of each deterioration progress degree, are in the ascending order, that is, the order of increase rate of deterioration progress degrees are in the ascending order. Giving the priority to the control device 300 having the higher rank, the time constant is decreased; therefore, it is expected that the time constant is prevented from being excessively large, and (d(j)−r(j))/t(j) will be leveled.

Figure 15:
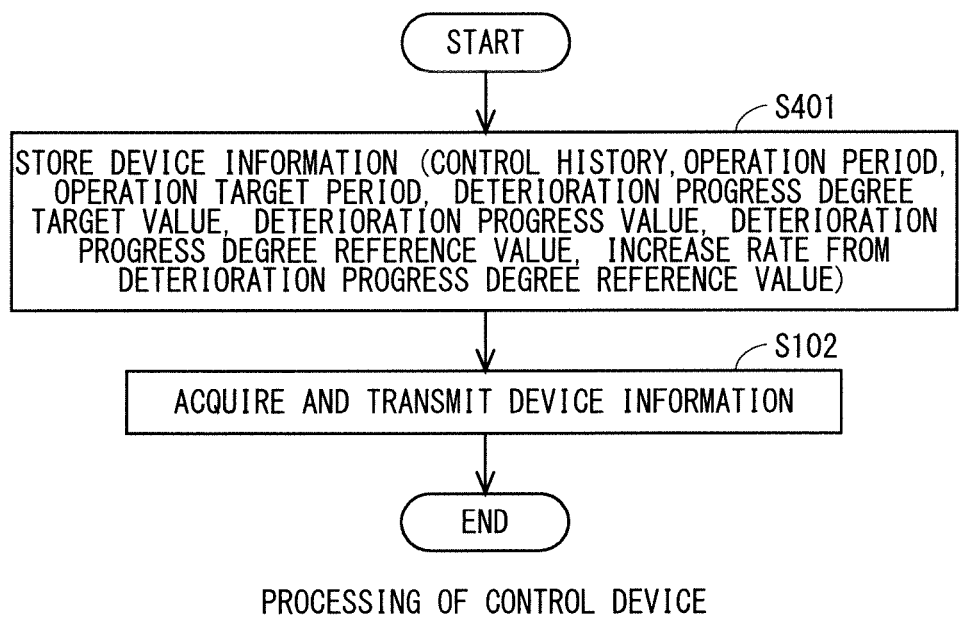
FIG. 15 A flowchart illustrating a flow of processes until a process a control device according to Embodiment 4 transmits device information to a system control device.
Figure 16:
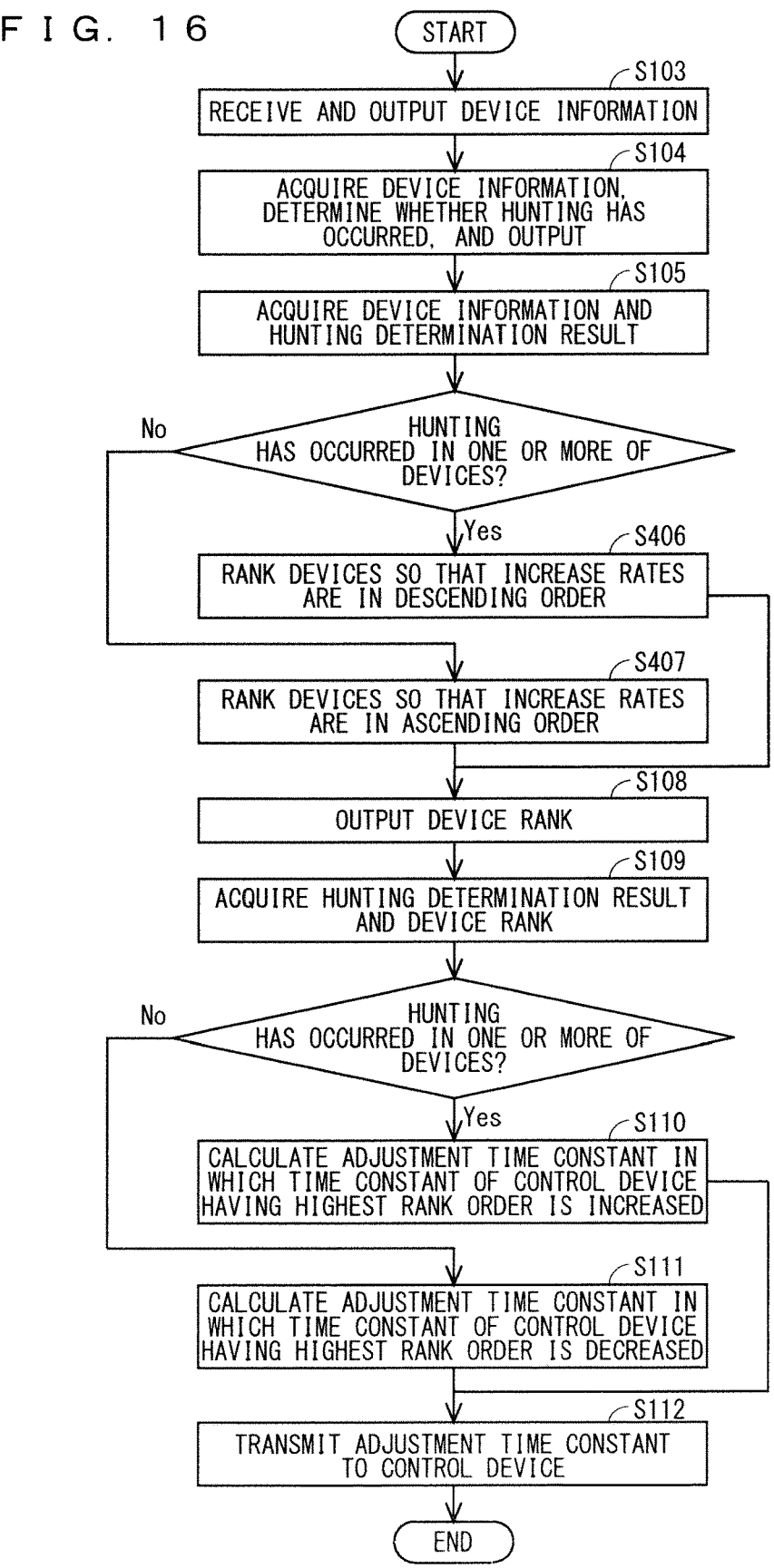
FIG. 16 A flowchart illustrating a flow of processes for adjustment time constant calculation of the system control device according to Embodiment 4.

A method of system control employed in the system control device 200 according to Embodiment 4 will be described with reference to FIG. 1, FIG. 2, FIG. 15, and FIG. 16. The parts different from Embodiment 1 will be described. In the flowcharts of FIG. 15, and FIG. 16, for Steps S102 to S105 and Steps S108 to S114 in the flowchart shown in FIG. 2 of Embodiment 1, the same processing as in Embodiment 1 are used; therefore, the same reference numerals as those in FIG. 2 are attached, and the processes in Step S401, Step S406, and Step S407 are different from those in Embodiment 1.

FIG. 15 is a flowchart illustrating a flow of processes until a process the control device 300 according to Embodiment 4 transmits device information to the system control device 200. In Step S101 of Embodiment 1, the control device 300 stores the control history and the deterioration progress degree in the device information storage unit 6. Whereas, in Step S401 of Embodiment 4, the control device 300 stores the control history, the operation period, the operation target period, the deterioration progress degree target value, the deterioration progress degree, the deterioration progress degree reference value, and the increase rate from the deterioration progress degree reference value (=(deterioration progress degree−deterioration progress degree reference value)/deterioration progress degree target value) in the device information storage unit 6. Here, although the above increase rate is stored by the control device 300 side, Embodiment 4 is not limited thereto, and control may be performed so that the system control device 200 calculates thereof.

FIG. 16 is a flowchart illustrating a flow of processes for adjustment time constant calculation of the system control device 200 according to Embodiment 4. In Embodiment 4, the adjustment time constant is calculated taking the ratio of the difference between the deterioration progress degree and the deterioration progress degree reference value to the deterioration progress degree target value into consideration. In Embodiment 4, although the ratio to the deterioration progress degree target value is referenced, Embodiment 4 is not limited thereto, and when the increase rate between the control devices 300 can be compared based on the difference between the deterioration progress degree and the deterioration progress degree reference value, the difference alone may be applicable.

In Step S106 of Embodiment 1, the device rank calculation unit 3 ranks the control devices 300 in the order of progression of the deterioration progress degree. Whereas, in step S406 of Embodiment 4, the device rank calculation unit 3 ranks the control devices 300 so that the increase rates of the deterioration progress degrees are in the descending order. As in Embodiment 1, the ranking is an example, and control may be applicable in which the time constant calculation unit 4 calculates an adjustment time constant in which the time constant of the control device 300 having a large increase rate of deterioration progress degree is increased without calculating the ranking. In this case, it is even more preferable to select the control device 300 having the largest increase rate of the deterioration progress degree and control to calculate the adjustment time constant.

In Step S107 of Embodiment 1, the device rank calculation unit 3 ranks the control devices 300 in the reversed order of progression of the deterioration progress degree. Whereas, in step S407 of Embodiment 4, the device rank calculation unit 3 ranks the control devices 300 so that the increase rates of the deterioration progress degrees are in the ascending order. As in Embodiment 1, the ranking is an example, and control may be applicable in which the time constant calculation unit 4 calculates the adjustment time constant in which the time constant of the control device 300 having a small increase rate of deterioration progress degree is decreased without calculating the ranking.

As described in Embodiment 1, the ranking by the device rank calculation unit 3 is not limited. Any control method can be employed as long as the time constant of the control device 300 having a large increase rate of the deterioration progress degree is increased and the time constant of the control device 300 having a small increase rate of the deterioration progress degree is decreased.

As described above, in Embodiment 4, the deterioration progress degree target value, the deterioration progress degree, and the deterioration progress degree reference value of the control device 300 are stored in the device information storage unit 6 in advance, the device rank calculation unit 3 ranks the control devices 300 based on the increase rate of the deterioration progress degree of each control device 300 (=(deterioration progress degree−deterioration progress degree reference value)/deterioration progress degree target value).

The time constant calculation unit 4 calculates the adjustment time constant of each control device 300 based on the calculated device rank. Specifically, the adjustment time constant in which the time constant of the control device 300 having a larger increase rate is increased is calculated and the time constant of the control device 300 having a smaller increase rate is decreased is calculated.

In Embodiment 4, the parts different from Embodiment 1 have been described. The other parts are the same as in Embodiment 1. Accordingly, in the whole system, the increase rates of the deterioration progress degrees will be leveled while suppressing hunting in each control device 300, and failure in a plurality of devices at the same time can be prevented.

The foregoing configurations of Embodiments are configuration examples of the present invention. It should be noted that Embodiments of the present invention can be arbitrarily combined and can be appropriately modified or omitted without departing from the scope of the invention.

EXPLANATION OF REFERENCE SIGNS

1 device information reception unit, 2 hunting determination unit, 3 device rank calculation unit, 4 time constant calculation unit, 5 time constant transmission unit, 6 device information storage unit, 7 device information transmission unit, 8 time constant reception unit, 9 time constant adjustment unit, 10 consumed power measurement unit, 11 consumed power transmission unit, 12 generated power measurement unit, 13 generated power transmission unit, 14 consumed and generated power reception unit, 15 device information estimation unit, 100 power transmission and distribution system, 200 system control device, 300 control device, 400 power consumption facility, 500 power generation facility

The invention claimed is:

1. A system control device, comprising:
a processor to execute a program;
an output interface; and
a memory to store the program which, when executed by the processor, performs processes of,
determining whether hunting has occurred or not for each of control devices in a power transmission and distribution system based on a control history of the control devices;
calculating an adjustment time constant in accordance with state information of the control device, which is any one type of information among a hunting determination result of whether hunting has occurred or not, a deterioration progress degree indicating a progress degree of deterioration of the control device, an increase rate of a deterioration progress degree indicating how many the deterioration progress degrees of the control device have increased from the deterioration progress degree at a reference time, and a power loss of the control device and a power loss estimation value of the control device; and
transmitting the adjustment time constant to the control device through the output interface.

2. The system control device according to claim 1, wherein,
the state information includes any of the deterioration progress degree, the increase rate of the deterioration progress degree, and the power loss, and
when the processor determines that the hunting has occurred in one or more of the control devices, the processor calculates the adjustment time constant in which a time constant of the control device is increased.

3. The system control device according to claim 2, wherein,
the state information includes any of the deterioration progress degree, the increase rate of the deterioration progress degree, and the power loss, and
when the processor determines that no hunting has occurred in one or more of the control devices, the processor calculates the adjustment time constant in which a time constant of the control device is decreased.

4. The system control device according to claim 1, further comprising:
an input interface to receive consumed power of a power consumption facility included in the power transmission and distribution system and generated power of a power generation facility included in the power transmission and distribution system, wherein
the state information is the power loss estimation value,
the processor estimates the power loss when the time constant is increased by a predetermined time for each of the control devices and calculates respective power loss estimation values based on the generated power, the consumed power, and the device information, and
when the processor determines that the hunting has occurred in one or more of the control devices, the processor calculates the adjustment time constant by increasing the time constant of the control device when the power loss estimation value is decreased by the predetermined time.

5. The system control device according to claim 4, wherein
the processor estimates the power loss when the time constant is decreased by a predetermined time for each of the control devices and calculate respective power loss estimation values based on the generated power, the consumed power, and the device information, and
when the processor determines that no hunting has occurred in one or more of the control devices, the processor calculates the adjustment, time constant by decreasing the time constant of the control device when the power loss estimation value is decreased by the predetermined time.

6. The system control device according to claim 1, wherein,
the state information includes any of the deterioration progress degree, the increase rate of the deterioration progress degree, and the power loss, and
every time a time constant of the control device is updated with the adjustment time constant, the processor determines whether the hunting has occurred or not,
every time the processor determines that the hunting has occurred in one or more of the control devices, the processor calculates the adjustment time constant in which the time constants of the control devices are increased, and
every time the adjustment time constant is calculated, the processor transmits the calculated adjustment time constant to the corresponding control device and has the time constant of the control device updated.

7. The system control device according to claim 6, wherein,
every time the processor determines that no hunting has occurred in one or more of the control devices, the processor calculates the adjustment time constant in which the time constants of the control devices are decreased.

8. A method of system control, comprising:
- determining whether hunting has occurred or not for each of control devices in a power transmission and distribution system based on a control history of the control devices;
- calculating an adjustment time constant in accordance with state information of the control device, which is any one type of information among a hunting determination result of whether hunting has occurred or not, a deterioration progress degree indicating a progress degree of deterioration of the control device, an increase rate of a deterioration progress degree indicating how many the deterioration progress degrees of the control device have increased from the deterioration progress degree at a reference time, and a power loss of the control device and a power loss estimation value of the control device; and
- transmitting the adjustment time constant to the control device.

* * * * *